Feb. 14, 1950     O. M. LERCH     2,497,225
SMOKING PIPE STEM JOINT
Filed Oct. 14, 1944     2 Sheets-Sheet 1
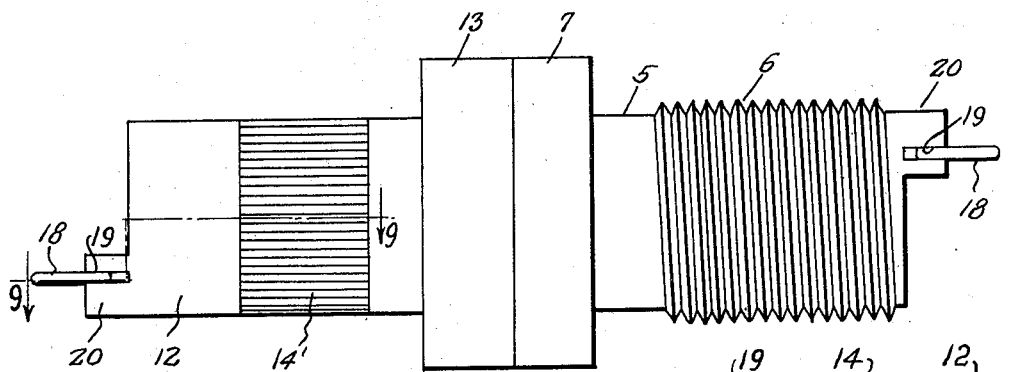
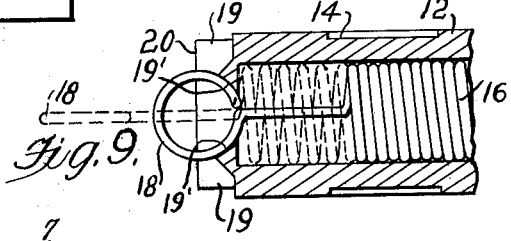
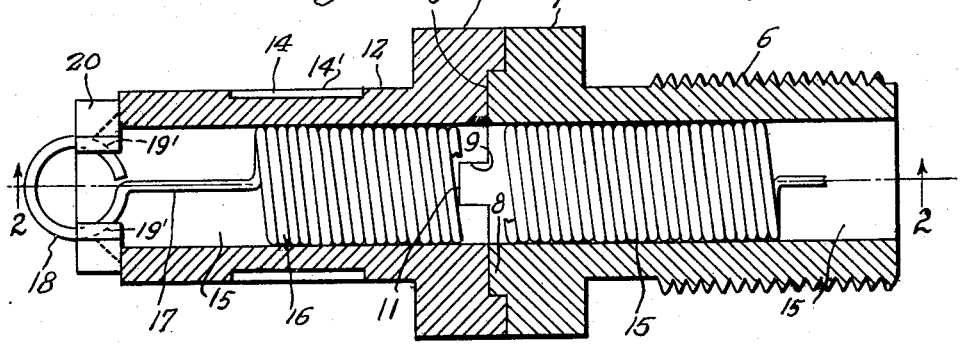
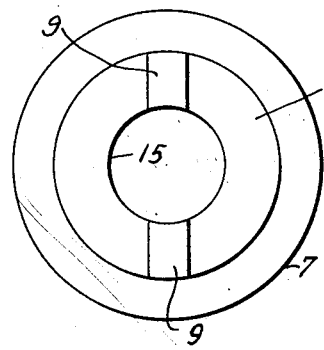
Inventor
Oliver M. Lerch,
By Clarence A. O'Brien
and Harvey B. Jacobson
Attorneys Feb. 14, 1950          O. M. LERCH          2,497,225
                   SMOKING PIPE STEM JOINT
Filed Oct. 14, 1944                    2 Sheets-Sheet 2
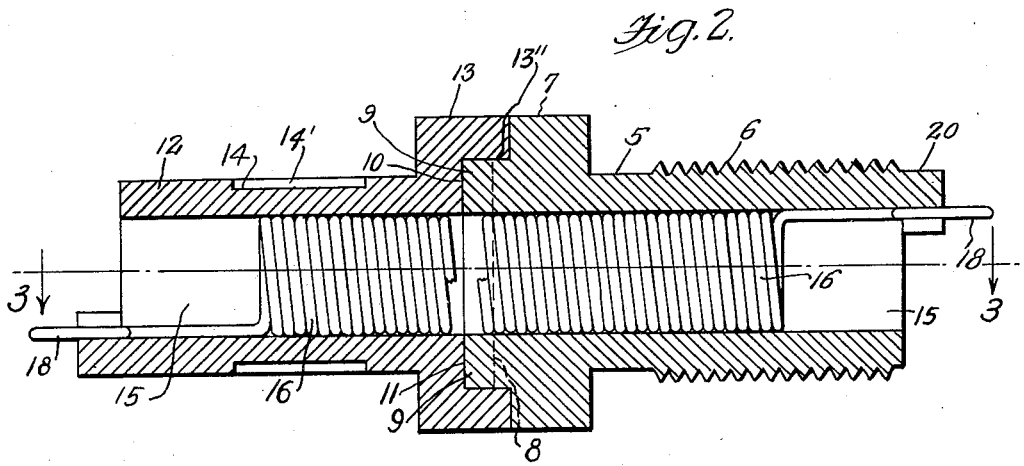
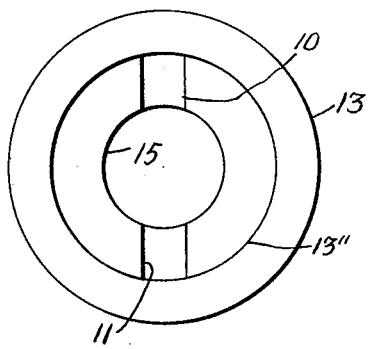
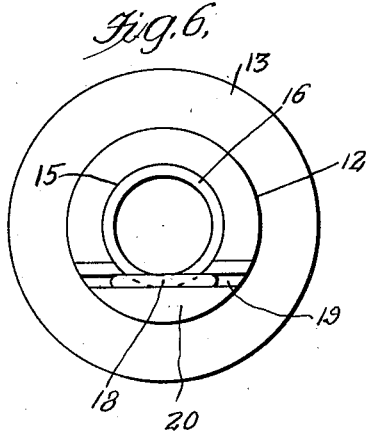
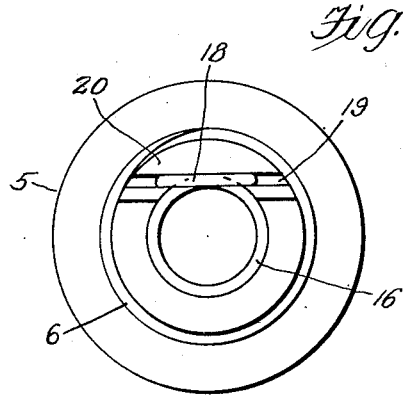
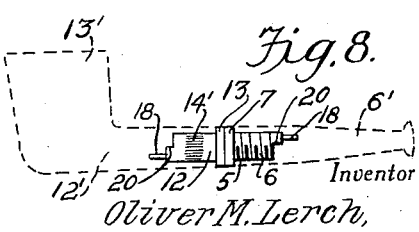
Inventor
Oliver M. Lerch,
By Clarence A. O'Brien
and Harvey B. Jacobson
Attorneys Patented Feb. 14, 1950

2,497,225

UNITED STATES PATENT OFFICE 2,497,225

SMOKING PIPE STEM JOINT

Oliver M. Lerch, Gifford, Pa.

Application October 14, 1944, Serial No. 558,664

3 Claims. (Cl. 131—225)

The present invention relates to a joint for connecting the stem to the bowl part of a pipe, the general object of the invention being to provide a pair of bushings, one of which fits into the stem of the bowl part of the pipe and the other into the end of the mouth piece of the stem opposite the bit end, together with spring means for connecting the bushings together so as to provide a joint with a flexible and not easily broken connection preventing one bushing from pulling off the other, the present invention constituting an improvement over my prior Letters Patent No. 1,921,530, and resides in a novel construction for anchoring the bushings in position as well as for anchoring the ends of the spring in the respective bushings to yieldably secure the same to each other in connected position.

Other objects and advantages reside in the details of construction and operation as more fully hereinafter described and claimed, reference being had to the accompanying drawing forming part hereof, wherein like numerals refer to like parts throughout and in which Figure 1 is a side elevational view of the joint in assembled position.

Figure 2 is a longitudinal sectional view taken on the line 2—2 of Figure 3 with the spring broken away and shown in elevation.

Figure 3 is a horizontal sectional view of the spring securing means and taken on the line 3—3 of Figure 2, with the spring broken away and shown in plan.

Figure 4 is an end elevational view of the male part of the joint.

Figure 5 is a similar view of the female part of the joint.

Figures 6 and 7 are outer end elevational views of the respective outer ends of the joint.

Figure 8 is a view showing the joint applied to a smoking pipe.

Figure 9 is a fragmentary view in longitudinal section taken on the line 9—9 in Figure 1 and showing in dotted lines how one of the eyes is pulled out of the grooves.

Referring now to the drawings in detail, the numeral 5 designates the male part of a bushing or connector joint externally threaded as at 6 for threaded engagement in the stem 6' of a smoking pipe, one end of the bushing being formed with an annular flange 7, the end of the bushing adjacent said flange being formed with a reduced annular boss 8 having a pair of radially extending lugs 9 adapted to seat within notches 10 and 11 respectively formed in the abutting end portion of the female part of the bushing 12, said female part likewise being formed at its abutting end with an annular flange 13 forming an annular recess 13", as will be clearly apparent from an inspection of Figures 1, 2 and 3 of the drawing.

This female part of the bushing 12 is formed with a plurality of longitudinally extending grooves 14, said grooves being arranged in closely spaced relation to define longitudinally extending ribs 14' engageable with the walls of the bore of the stem portion 12' of a pipe bowl 13' to secure the parts in position therein by frictional engagement of the edges of said ribs with said stem portion.

The parts 5 and 12 of the bushing are formed with aligned bores 15 communicating with the smoke passage in the pipe stem and within said bores is positioned an expansible coil spring 16 having its ends 17 formed with longitudinally extending eyes 18 to seat within grooves 19 extending transversely of a segmental extension 20 formed on the respective end portions of the bushing.

The grooves 19 are each formed therein with a pair of suitable seats 19' for the eyes 18, the seats 19' in each pair preventing said eyes 18, when seated, from being drawn into the bores 15 by reaction of the spring 16. By pulling the eyes 18 out of the grooves 19, and thus away from the pairs of seats 19', and then turning said eyes 18 into planes at substantially a right angle to the extensions 20, as shown in dotted lines in Figure 9, said eyes 18 may be positioned to clear said extensions 20 so that the spring 16 may be pulled out of bores 15 in bushings 5 and 12. In inserting the spring 16 in the bores 15, said spring is turned to position the eyes 18 at substantially a right angle to said extensions 20 so as to pass through said extensions. The spring 16 is then inserted into the bores 15, a suitable distance, and the eyes 18 grasped and pulled out of said bores 15 past said extensions after which said eyes 18 are turned so as to be drawn into the grooves 19 against the pairs of seats 19' by reaction of the spring 16.

As will be apparent from an inspection of Figures 1, 2 and 3 of the drawings the eyes or ring members 18 project outwardly beyond the segmental extensions 20 to provide a finger grip therefor whereby to permit the eyes to be withdrawn from the grooves 19 and the seats 19' for the purpose of separating the two parts of the bushing when the same are to be removed from the pipe stem.

The bushings 5, 12, as will now be seen are connected together primarily by a pull apart joint formed by the boss 8, lugs 9 and the notches 10, 11, the spring 16 providing an extensible connection, not easily broken and maintaining the bushings connected if the same should accidently be pulled apart, so that said bushings will not fall to the ground or floor if either is pulled from the other.

It is believed the details of construction and operation of the device will be readily understood from the foregoing without further detailed explanation.

What is claimed is:

1. A connector between the bowl stem and mouth-piece stem of a pipe comprising longitudinally aligned male and female bushing members having interfitting engagement at one end, said bushing members having a bore extending therethrough, an expansible coil spring positioned in the bore, segmental extensions at the outer ends of the bore having grooves therein, and eyes extending longitudinally from the ends of said spring and releasably engageable in said grooves.

2. A connector between the bowl stem and mouth-piece stem of a smoking pipe and comprising longitudinally aligned male and female bushings having interfitting engagement at their abutting ends, means carried by said bushings for releasably securing the same to the bowl stem and mouth-piece stem respectively of the pipe, said bushings having aligned bores extending therethrough, an expansible coil spring positioned in said bores, segmental extensions at the outer ends of said bushings and offset from the center of the bores, transverse grooves formed in said extensions and eyes on the ends of said spring releasably engageable in said grooves.

3. A connector between the bowl stem and mouth-piece stem of a smoking pipe comprising longitudinally aligned male and female bushings, said female bushing having an annular recess in one end, radially extending notches in the end of said female part communicating with said recess, an annular boss on one end of the male bushing adapted to seat in said recess, radially extending lugs on said boss adapted to seat in the notches to prevent relative rotation of the bushings, means on the bushings for releasably securing the same respectively to the bowl stem and mouthpiece stem portions of the pipe, said bushings having aligned bores extending therethrough, a coil spring positioned in said bores, offset extensions on the outer ends of said bushings, grooves extending laterally in said extensions and longitudinally extending eyes on the ends of said spring releasably engageable in said grooves, said eyes projecting outwardly beyond said extensions.

OLIVER M. LERCH.

REFERENCES CITED

The following references are of record in the file of this patent:

UNITED STATES PATENTS

| Number | Name | Date |
| --- | --- | --- |
| 1,921,530 | Lerch | Aug. 8, 1933 |
| 2,134,197 | Miller | Oct. 25, 1938 |
| 2,164,982 | Beaudry | July 4, 1939 |